United States Patent Office 3,614,973
Patented Oct. 26, 1971

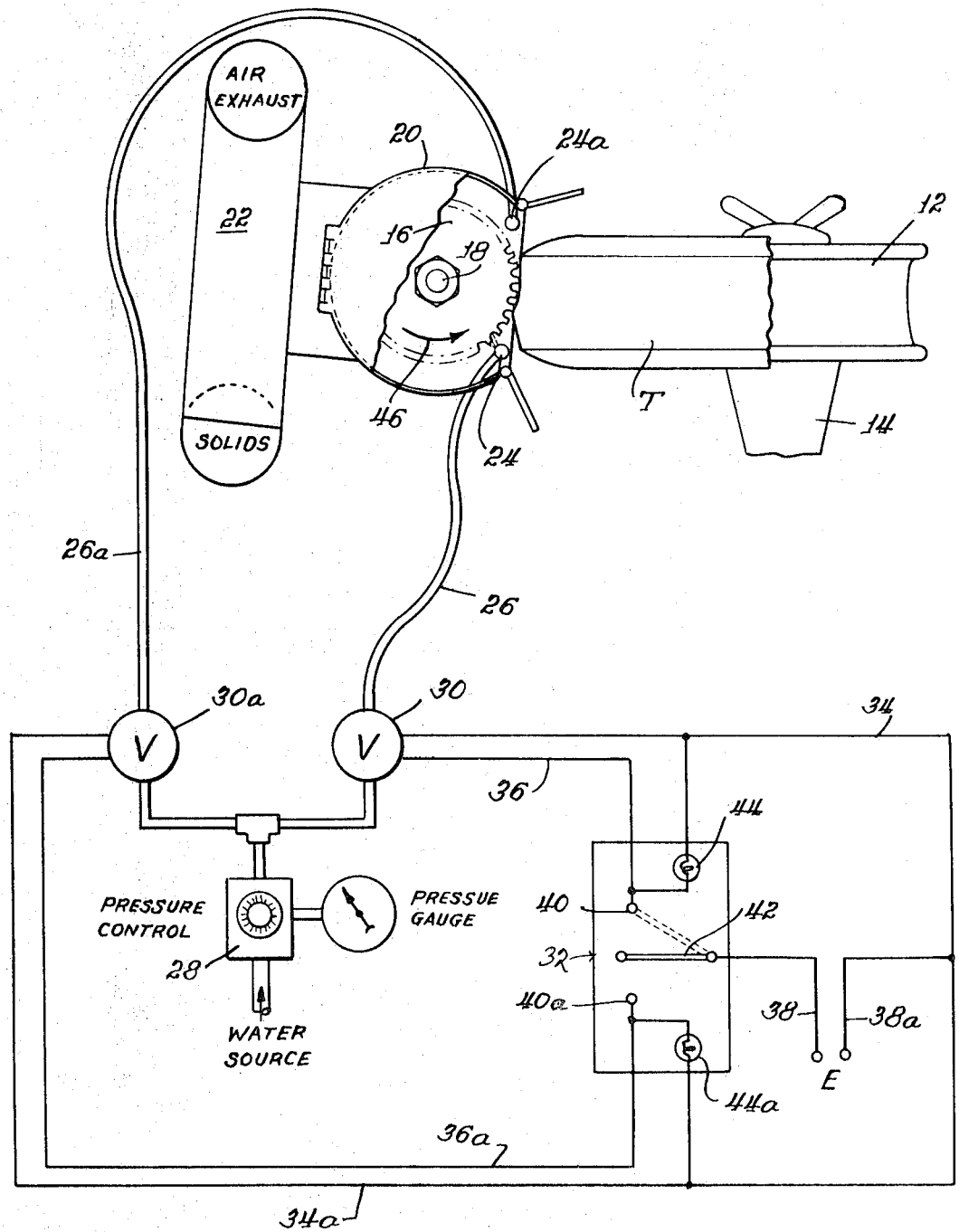

3,614,973
TIRE CASING CONDITIONING MEANS
AND METHOD
Wayne E. Jensen, Homewood, and George B. Davison, Glenwood, Ill.; said George B. Davison assignor to B & J Manufacturing Company, Glenwood, Ill.
Filed July 30, 1969, Ser. No. 846,160
Int. Cl. B29h 21/08
U.S. Cl. 157—13                                         13 Claims

ABSTRACT OF THE DISCLOSURE

Attachment for tire buffing machines by which water is sprayed onto the rotating tool ahead of its engagement with the tire to cool the tool and reduce emission of smoke during the action of the tool on the tire.

---

This invention relates to novel means and method of removing tread or conditioning used and worn tire carcasses in preparation for the application of new tread material to the periphery thereof.

A principal object of the invention is the suppression and/or elimination of smoke and the like which in the past accompanied the action of the rapidly rotating rasp on the carcass of the tire when removing old and worn tread therefrom. The emitted smoke not only hampered the operator's view of the rasp action on the tire carcass, but is considered a source of air pollution or contamination to which health authorities are concentrating their attention.

Conventionally a tire carcass is prepared for recapping or otherwise applying new tread material to the periphery thereof by first removing the old material and conditioning the remaining surface to a texture which will accept the newly applied tread material. This is obtained by moving a rapidly rotating rasp across the periphery of a more slowly rotating tire carcass, or in reverse, so that the teeth of the rapidly rotating rasp or the tool bite into and abrade, cut, rub, buff or otherwise effectively remove, and/or wear off the old and oxidized material from the tire carcass and condition the remaining surface for application of the new rubber or other material in which the new tread is formed.

In recent years tire manufactures have been filling their tires with much finer grades of carbon black and also adding large quantities of oil. When removing the old oxidized material and/or tread from these tires in preparation for recapping and/or the application of new tread material, the action of the rasp generates a considerable amount of friction, producing much smoke and other gaseous pollutants. Smoke emission will also occur if the rasp is dull or if the tire is insufficiently inflated or if the tire is not rigid. Scorching of the tire surface under these circumstances can also be a problem.

It has been found, however, that if the teeth of the rasp are rotated through a very fine spray or mist of fluid such as water immediately ahead of their engagement with the tire carcass then there is an advantageous cooling of the rasp. Some of the water will also be carried by the rotating rasp into the locus of the cutting, abrading or other action. As a result, the blades or teeth of the rasp are effectively lubricated as they cut through the rubber of the tire carcass so that friction is reduced and the temperature of the chips and dust thrown off is kept below a potential ignition point. The water also tends to congeal or coagulate the powdery dust into larger size particles which are more efficiently handled by the exhaust or collecting system. The result is to effectively reduce, and in most instance, entirely eliminate the smoke problem and thereby undesired contamination of the surrounding atmosphere. We have further found that the volume of water required to effect this advantage can be kept low so that the much smaller amount of heat developed is nevertheless sufficient to rapidly dry the tire. Furthermore, scorching of the tire carcass surface is avoided and the resultant surface is one to which the newly applied rubber in the subsequent recapping or molding operation will effectively bond and vulcanize.

Thus an important feature of this invention is that means of buffing, abrading and/or removing tread from used tire carcasses using conventionally available equipment may be modified in a convenient, simple, wholly practical manner and so that the atmosphere in the buffing room, and particularly adjacent the buffing or rasp action remains clean and with the result that there is less of a fire hazard and atmospheric pollution is eliminated.

A further feature of the invention is that the armature of the rasp motor runs cooler and there is a noticeable reduction in the amperage requirements of the rasp motor. Thus the practice of the invention represents a savings in operation costs and equipment.

A further important feature of the invention is the improvement in the texture of the tire carcass surface which results because of the cooler buffing action on the tire carcass. Thus we have found that the resultant texture of the tire carcass is clean and fresh in the sense that it is essentially scorch free and has been washed dust free. The cooler buffing action also contributes to an improvement in the adherence of the subsequently applied rubber.

Still another feature of the invention is that the life of the blades is increased from 50% to 100%. At the same time the added cost in terms of electrical power and water consumption are negligible and the operation is essentially free of maintenance and service problems.

Many other features and advantages will be at once apparent and/or will become so upon consideration of the more detailed description of a preferred embodiment of the invention which will now be described.

Referring therefore now to the drawing, the figure schematically illustrates one manner in which the invention may be practiced. In said figure T represents a tire mounted on a support 12 which is slowly rotated about a shaft or axle 14 by means of a motor not shown. 16 represents a rasp or other tool of conventional construction used to remove the tread and/or condition the tire carcass when held thereagainst. For example, rasp 16 may comprise a tire rasp having rows of spaced V-shaped teeth about its periphery as shown in Jensen U.S. Pat. 2,703,-446 issued Mar. 8, 1955. Alternatively it may comprise a rasp having blades constituting rows of spaced dovetail shaped teeth about its periphery as shown in E. B. Jensen Pat. 3,082,506, issued Mar. 26, 1963. It will be understood, however, that the present invention permits an improved abrading and/or buffing action to be obtained when using any of the conventionally available tire buffing machines and/or rasps.

Rasp 16 is shown mounted to rotate about a shaft 18 and is conventionally rotated by its motor (not shown) at a greater peripheral speed than is the tire T. For example, in one known tire tread removing machine the tire is rotated at about 50 to 90 r.p.m. while the rasp is rotated at speeds of 2800 to 5000 r.p.m. As illustrated, shaft 14 on which tire T is mounted is at an angle of about 90° with respect to the axis of shaft 18 on which the rasp rotates. However, in other known tire tread removing or buffing machines to which this invention is also applicable, both the tire and rasp rotate on more nearly parallel axes. It will be understood further that the supporting structure for both shaft 14 and shaft 18 have been omitted for the sake of simplifying illustration of the invention. However, the supporting structure for both the rasp and the tire support are of conventional structure and it will be understood that means are provided whereby either the rasp or the tire support is adapted to be adjusted toward and away from the other in order that the abrading action of the rasp blade teeth on the tire periphery may be obtained to a required depth. Either the rasp or the tire support is also movable transversely relatively to the other so that the abrading or buffing action is conducted across the full width or surface of the tire carcass periphery. Conventionally, rasp 16 is partially enclosed by a shroud or cowl indicated at 20 and is connected to an exhaust system indicated generally at 22 which withdraws smoke, dust, chips and the like emitted from the action of rasp 16 on the tire T.

In accordance with this invention, one or more spray devices or nozzles are connected by piping to a suitable source of water under pressure. Each of said nozzles has one or more small orifices in accordance with the amount of water to be sprayed onto the periphery or teeth of the rotating rasp. The nozzle or nozzles are so spaced from the periphery of the rasp immediately ahead of the engagement of the rasp with the tire T that the orifice will direct a spray of water across the cutting width of the rasp.

In the illustrated embodiment of the invention, two such spray nozzles are shown at 24 and 24a mounted on the support for the rasps adjacent the two edges of the surrounding shroud 20 and so as to be on opposite sides of the engagement of the tire rasp with the tire carcass periphery. Nozzle 24 is connected by piping 26 and nozzle 24a by piping 26a to a control device 28 which in turn is connected to a source of water under pressure. Control device 28 is adjustable to vary the pressure of water in accordance with the spacing of the nozzle from the rasp periphery, the depth of cut and/or the characteristics of the tire being worked by the rasp. In each of said piping 26 and 26a is a solenoid-operated shut-off valve 30 and 30a respectively, which are under the control of a switching device indicated generally at 32. As illustrated, the solenoids of each of said valves is connected by a conductor 34 or 34a to a common conductor 38a which connects to one side of an electrical power source indicated at E. The other side of the solenoid of the two shut-off valves 30 and 30a are connected by conductors 36 and 36a to contacts 40 and 40a respectively. 42 represents a switching element which is connected by conductor 38 to other side of the power source E. Switching element 42 is adapted to be moved between its full line illustrated neutral position into engagement with either contact 40 or 40a to selectively complete a circuit which will energize the solenoid of one of said shut-off valves 30 or 30a. As illustrated, an indicator lamp 44 or 44a is provided in each said circuits and in series with the solenoid of the respective shut-off valves so that their illumination indicates which of the two valves has been opened and therefore which nozzle is spraying water onto the rotating rasp 16. Thus when rasp 16 is rotating in the direction as indicated by arrow 46, it will be understood that switch element 42 will be moved into engagement with contact 40 as shown by broken lines to complete a circuit which will open shut-off valve 30 and allow water to be sprayed under pressure through the orifice of spray nozzle 24 onto the teeth of the rotating rasp immediately ahead of its action on the periphery of the more slowly rotating tire T. When the direction of the rotation of the rasp is reversed, switching element 42 will be located to engage contact 40a and so close the circuit which will energize shut-off valve 30a causing water to be sprayed from nozzle 24a onto the tire rasp.

Thus it is a feature of the invention that the teeth of the rotating rasp are caused to pass through the water spray to be effectively cooled thereby ahead of their cutting, abrading or buffing action with the periphery of the tire carcass T and so that the rotation of the rasp will also carry the water onto the surface of the tire carcass in the locus where the rasp is acting thereon.

In apparatus where it is not required that rotation of the rasp be reversed, one of the spray nozzles may be omitted. Also, if only one nozzle is employed, it may be desirably located so that its orifice is more nearly directed toward the locus of the abrading or rasping action. We find, however, that there is a greater reduction in the amount of heat generated in the rasp blades and with consequent longer blade life if the spray is applied to the rasp blade teeth ahead of its action on the tire tread and the rasp is allowed to carry the water and its cooling effect into the rasping action.

As noted above, the nozzle or nozzles are so spaced from the periphery of the rotating rasp that the spray therefrom envelops the full cutting width of the rasp teeth in a mist. Although the amount of water which is thus sprayed onto the teeth of the rotating rasp and/or the surface of the tire carcass periphery at the locus of the rasping action will vary with the characteristics of the tire being buffed, most satisfactory results are obtained when the pressure of the water flow is kept within a range of about 5 to 35 pounds per square inch and the discharge orifice of the nozzle or nozzles has a diameter between about .030 and .080 inch in diameter. .040 inch represents a preferred orifice diameter, since it is found that the same will apply about 1.3 pints of water per minute at the indicated pressure range and in a fine spray across the width of the conventional size rasp. Where a larger volume of water is required, as for example at an increased cutting depth, it is preferable not to increase the size of orifice, but rather to increase the number of orifices, since it has been found that at the indicated range of pressures an orifice of this size is not subject to clogging. At the indicated pressure and orifice size, the volume of water sprayed has been found sufficient to substantially eliminate all evidence of smoke. It is also low enough to avoid any substantial wetting of the tire casing. At the indicated ranges of pressure and orifice sizes we have found that the buffing action proceeds at a sufficiently low temperature that not only is there no emission of smoke, but that at the end of the operation there is no evidence of scorching of the buffed surface, which is only warm to the touch. Neither is there a sufficient amount of water present on the buffed surface to be noticeable to the eye or to the touch. The unbuffed side walls of the tire carcass are either free of moisture and/or quickly dry. Because of the much lower amount of friction generated there is no accompanying smoke, although occasionally a small amount of steam may be noticed immediately adjacent the tire carcass periphery. The rubber dust and chips proceed freely through the ducts of the collector and are cool to the touch. They have a fresh odor and are sufficiently free of moisture so that they do not ball together when impacted.

From the above description of the invention it will be apparent that all the recited objects, advantages and features of the invention have been demonstrated as obtainable in a highly efficient and practical manner. It will be further appreciated that the described apparatus constituting the invention may be either built into the tire tread removing machine and/or provided as an attachment for mounting to an existing machine.

Thus having described our invention, we claim:

1. In removing tread from a tire carcass by contacting the tread of a rotating tire carcass with the peripheral edge of a more rapidly rotating rasp and moving the rasp or tire carcass relative to the other such that the peripheral edge of the rasp traverses the width of the tread, the improvement which comprises reducing the emission of smoke by wetting the outer peripheral edge of the rotating rasp with water immediately ahead of its contact with the tire carcass tread considering the direction in which the rasp rotates, the water being carried by the peripheral edge of the rotating rasp into the action of the rasp on the tire carcass.

2. The improvement as claimed in claim 1 wherein the water is applied to the peripheral edge of the rotating rasp in an amount sufficient to retard the generation of heat in the locus of the action caused by contact of the rasp with the tire carcass so as to substantially eliminate the emission of smoke.

3. The improvement as claimed in claim 1 wherein air is circulated across the contact of the peripheral edge of the rotating rasp with the tire carcass.

4. In a tire buffing apparatus which includes a first support, a rasp rotatably mounted on said first support, a second support adapted for mounting a tire carcass for rotation with respect to rotation of the rasp, and means for feeding and moving one of said supports relative to the other to effect engagement of the peripheral edge of the rasp across a tire carcass rotatably mounted on said second support, the combination therewith of spray means mounted on said first support having an orifice directed toward the peripheral edge of the rasp, and means connectible to a source of water for delivering water to said spray means under pressure, the orifice of said spray means being of a size and so directed that a spray containing water is directed therefrom onto the peripheral edge of the rotating rasp immediately ahead of its contact with the tire carcass considering the direction in which the rasp rotates so that rotation of the rasp carries the water into the action of the rasp on the tire carcass and effectively reduces the emission of smoke from the action of the rotating rasp on the tire carcass.

5. For use in a tire buffing apparatus which includes a first support, a rasp rotatably mounted on said first support, a second support adapted for mounting a tire carcass for rotation with respect to rotation of the rasp, and means for feeding and moving one of said supports relative to the other to effect engagement of the rasp across a tire carcass rotatably mounted on said second support, the improvement wherein spray means are mounted on said first support having an orifice directed toward the rasp, the spray means comprising a pair of nozzles located with their orifices directed to opposite sides of the engagement of the rasp with the tire carcass and immediately ahead of said engagement, the orifice of said nozzles being of a size such that a spray containing water is directed therefrom onto the rotating rasp immediately ahead of its contact with the tire carcass so as to effectively cool the rasp and reduce the emission of smoke from the action of the rotating rasp on the tire carcass.

6. The improvement of claim 5 having means for selectively energizing the one of the nozzles immediately ahead of the engagement of the rasp with the tire carcass in accordance with the direction in which the rasp is rotated.

7. The improvement of claim 5 wherein means are provided to withdraw air across the engagement of the rasp with the tire carcass.

8. The improvement of claim 5 wherein means are provided to adjust the pressure at which water is forced through the orifice of the nozzle means.

9. An attachment for a tire buffing apparatus including a first support rotatably supporting a tool for tread removing engagement with the periphery of a tire carcass mounted on a second support, said attachment comprising a pair of spray nozzles for mounting on opposite sides of the contact of the rotating tire tread removing tool with the tire carcass tread, said spray nozzles being adapted for connection to a source of water and means for mounting said spray nozzles on the first support with the nozzles directed to spray the tread removing tool immediately adjacent the contact thereof with the tire carcass tread, said nozzles being separately actuatable to deliver a spray of water onto the rotating tread removing tool immediately ahead of its engagement with the tire carcass tread in accordance with the direction in which said tool is rotated.

10. In conditioning a tire carcass by contacting the surface of a rotating tire carcass with the peripheral edge of a more rapidly rotating rasp which action has been accompanied by the emission of large quantities of visible smoke, the improvement which comprises reducing said emission of visible smoke by applying fluid to the outer peripheral edge of the rotating rasp immediately ahead of its contact with the tire carcass considering the direction in which the rasp and tire rotate, said fluid being carried by said edge of the rotating rasp into the locus of its action on the tire carcass.

11. In contacting the surface of a rotating tire carcass with the periphery of a more rapidly rotating rasp to remove material therefrom in preparation for recapping wherein the material contains fillers such as carbon black or oil which when heated produce quantities of smoke, the improvement which comprises reducing said production of smoke by spraying water onto the periphery of the rotating rasp immediately ahead of its contact with the tire carcass considering the direction in which the rasp rotates, the peripheral portion of said rasp wet with water carrying the water into the action of the rasp on the tire carcass so as to maintain a temperature therein such that the production of smoke is reduced and the remaining tire carcass is one to which newly applied rubber will effectively adhere.

12. The improvement according to claim 11 wherein the amount of water carried by the rasp into the action of the rasp on the tire carcass does not substantially wet the tire carcass.

13. The improvement according to claim 11 wherein air is continuously evacuated from the locus of the rasp action on the tire carcass.

References Cited

UNITED STATES PATENTS

| | | | |
|---|---|---|---|
| 2,133,438 | 10/1938 | Eger | 157—13 |
| 2,200,575 | 5/1940 | Haskins | 157—13 |
| 2,524,489 | 10/1950 | Strong | 157—13 |
| 2,535,281 | 12/1950 | Glynn | 51—273 |
| 2,711,620 | 6/1955 | Shelby | 51—273 |
| 2,788,851 | 4/1957 | Rawls et al. | 157—13 |

GRANVILLE Y. CUSTER, JR., Primary Examiner